United States Patent [19]
Voskuil et al.

[11] 3,793,044
[45] Feb. 19, 1974

[54] PIGMENT TREATMENT TO PREVENT SETTLING

[75] Inventors: Donald J. Voskuil, Muskego; Zygmunt Konieczny, Milwaukee, both of Wis.

[73] Assignee: PPG Industries, Inc., Pittsburgh, Pa.

[22] Filed: Dec. 1, 1970

[21] Appl. No.: 94,199

[52] U.S. Cl. ............................ 106/262, 106/308 N
[51] Int. Cl. ............................................ C08h 17/02
[58] Field of Search ................ 106/262, 308 N, 289

[56] References Cited
UNITED STATES PATENTS
2,622,987   2/1952   Ratcliffe .............................. 106/20

OTHER PUBLICATIONS

Chem. Abst. 62:732n–62:733q, 1965.

*Primary Examiner*—Theodore Morris
*Attorney, Agent, or Firm*—Frank J. Troy

[57] ABSTRACT

Amine-modified clays when produced in the presence of a pigment produce a composition having improved settling properties when incorporated into an organic solvent base coating composition.

6 Claims, No Drawings

PIGMENT TREATMENT TO PREVENT SETTLING

BACKGROUND OF THE INVENTION

This invention relates in one aspect to a method of producing a pigment composition having improved settling characteristics and in other aspects relates to the use of these pigment compositions in the preparation of organic solvent-based coating compositions.

Organophilic cation-modified clays originally exhibiting a substantial basic exchange capacity in which the clay cation has been replaced by a substituted cation of the class of onium bases are known as thickeners and suspending agents for paint and other organic compositions. In the prior art, the pre-formed cation-modified clays have been added to the composition wherein they were employed. Compositions within this general class are described in U.S. Pat. Nos. 2,531,440; 2,531,427 and 2,622,987, as well as in the Official Digest, July, 1949, pages 451–462.

DESCRIPTION OF THE INVENTION

It has now been discovered that where the organophilic cation-modified clay is prepared in the presence of the pigment to be suspended, subsequent compositions incorporating these pigments show superior stability to similar compositions wherein the pre-formed organophilic cation-modified clay is admixed with the pigment or added to the composition.

The compositions of this invention are prepared by dispersing in aqueous media the pigment and a clay exhibiting basic change properties, particularly those exhibiting comparatively high basic change properties and containing cations capable of more or less easy replacement and adding to this dispersion an onium compound which reacts with the clay by substitution of the clay cation with the cation of the organic onium compound, thereby producing an organophilic, cation-modified clay.

The clays exhibiting basic change properties in reaction with onium compounds are well-known and described in the art set forth above. The term "clay" as used in the specification and claims includes montmorillonite, viz., sodium, potassium, lithium, and other bentonites, magnesium bentonite, sometimes called hectorite and saponite. Other clays found in nature are nontronite, attapulgite, illite, zeolites, fuller's earth, particularly those of the Georgia-Florida type, halloysite, kaolinite, nacrite, and dickite. Clays, particularly those having high base-exchange capacities, as a result of certain structural atomic replacements, are believed to have negative charges which are normally neutralized by inorganic cations. As found in nature, therefore, they exist as salts of the weak clay-acids with bases, such as the alkali- or alkaline-earth metal hydroxides.

The base-exchange capacities of the various clays enumerated run from a low of about 3 to a high of about 100, based upon milliequivalents of exchangeable base per 100 grams of clay. Montmorillonite has comparatively high base-exchange capacities, viz., 60–100, kaolinite and halloysite have comparatively low base-exchange capacities, viz., 3–15 and 6–15, respectively; attapulgite and illite have higher base-exchange capacities, viz., 25–35 and 15–40, respectively. The clays of higher base-exchange capacities are particularly useful where high exchange of an organic base for the cation of the clay is desired.

Generally stated and in accordance with illustrative embodiments of this invention, a clay, particularly one exhibiting substantial base-exchange capacity, is reacted with an organic compound, more particularly one hereinafter generally defined and referred to as an "onium" compound, by substitution of the clay cation with the cation of the organic compound, which cation is of the class hereinafter referred to as an onium base. The resulting compound may be used in carrying out this invention or may be further reacted with another organic compound, resulting in attachment of an organic radical to what is hereinafter generally referred to as the onium radical, in place of a hydrogen in the base. This invention is not, however, restricted to the use of a reaction product of a base-salt with a clay-salt, but includes the reaction product of a free base with an acid-clay.

An onium compound has been defined in Hackh's Chemical Dictionary, Second Edition, as:

A group of organic compounds of the type $RXH_y$ which are isologs of ammonium and contain the element X in its highest positive valency, viz:

Where X is pentavalent as in ammonium, phosphonium, arsonium and stibonium; where X is tetravalent as in oxonium, sulfonium, selenonium and stannonium compounds; and where X is trivalent, as in iodonium compounds; and that they may be considered addition compounds of oxonium; carbonium, stibonium, c.d., -inium, -ylium.

A number of the compounds capable of reacting with clays, particularly bentonite, will be described; it is to be understood, however, that various other compounds reactable with clays, and particularly bentonite or hectorite, may be employed. These may include salts as aliphatic, cyclic, aromatic, and heterocyclic amines, primary, secondary, and tertiary amines and polyamines, also quaternary ammonium compounds, as well as other monovalent or polyvalent onium compounds, such as triphenylalkyl phosphonium-arsonium-stibonium-halides, dialkyl- or aryl-sulphonium and selenonium halides and pyrones, such as 2,5-dimethyl gamma pyrone hydrochloride.

Untreated sodium bentonite in contact with water absorbs large quantities of the water and swells, forming a gel. This swelling has been attributed to the lameller structure of the clay mineral and to absorption of water molecules onto surfaces of the mineral sheets, thus giving rise to a separation of the sheets as the oriented water layers build up to an appreciable depth. If the surfaces of the clay laminae contain organic matter as by the process of base-exchange with an organic base, the ability of water molecules to be absorbed is eliminated, and the clay no longer exhibits its former swelling capacity in water. Thus, Wyoming bentonite, for example, which is essentially the sodium salt of montmorillonitic acid, is capable of reacting with organic bases or their salts, e.g.:

1. 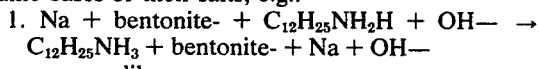
   $C_{12}H_{25}NH_3$ + bentonite- + Na + OH— or, more readily,

2. 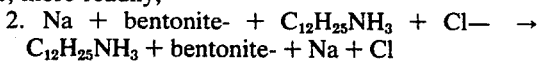
   $C_{12}H_{25}NH_3$ + bentonite- + Na + Cl

The resulting dodecylammonium bentonite is visualized as consisting of clay mineral laminae with dodecylammonium groups fairly regularly distributed over the surfaces and attached by means of the substituted ammonium groups, with the hydrocarbon tails extending out over the crystal surfaces. Such a material is now organophilic rather than hydrophilic and as such exhibits in organic liquids some of the characteristics which the untreated clay exhibited in water; for example, it will swell in many organic liquids and will form stable gels and colloidal dispersions. Such gels are visually homogenous and often trasparent or translucent. They are thermally stable up to the boiling point of the liquid phase and show little tendency to flow or run when heated. The more dilute systems which are more or less liquid have viscosity much higher than those of the liquids themselves, and in most cases exhibit thixotropy characteristic of the analogous bentonite-water system.

The situation is analogous to the above if the element X of the onium compound is other than nitrogen. The onium compound should, however, be such that, for example, a resultant onium-bentonite will have substantial swelling properties in organic liquids. Such swelling characteristic may be determined by introducing 2 grams of the onium-bentonite product in 100 milliliters of nitrobenzene and noting the amount of swelling in milliliters. Thus, in the case of amine-bentonite products, the employment of salts of aliphatic amines, including the octylamine, will not produce an amine-bentonite product showing a swelling over 7.2 milliliters; however, the dodecylamine bentonite product will show a swelling of from 27 milliliters to 65 milliliters. There is generally a distinct region of increase of swelling with amine-bentonites in which the amine has in excess of 10 carbon atoms in the carbon chain, such swelling being generally in excess of 25 milliliters. These products may well be called "high-swelling" onium-bentonites.

The ratio of the onium compound, such as, for example, an amine compound to bentonite, may be varied within certain limits in converting the bentonite to the organophilic condition. In general, it is satisfactory to react the amine salt with the bentonite in the ratio of 100 milliequivalents of amine salt to 100 grams of bentonite, which is approximately the base-exchange capacity of the standard highly swelling bentonites. Typical values of swelling on the above basis are listed below for a series of dodecylammonium-bentonites, in which the ratio of amine to bentonite was varied over wide limits:

|  | 50 me/ 100 g. | 75 | 100 | 125 | 150 | 200 | 300 |
|---|---|---|---|---|---|---|---|
| Amine/bentonite Swelling in nitrobenzene, ml. | 23.7 | 43.0 | 65.3 | 47.5 | 30.0 | 20.5 | 15.5 |

This table indicates the wide range over which the amine-bentonite ratio can be varied, but it also shows the optimum effect exhibited at the theoretical base-exchange value for this combination.

The pigment employed in the compositions of the invention may be any pigment conventionally employed in the art, for example, iron oxide, lead chromate, strontium chromate, carbon black, graphite, titanium dioxide, talc, barium sulfate, as well as color pigments such as cadmium yellow, cadmium red, hydrated iron oxide and the like.

The ratio of amine/clay components to pigment is not critical and normally is the ratio known in the art for the use of preformed cation-modified clay and pigments. For example, about 0.03 to about 0.10 pound of cation-modified clay is recommended per gallon of paint. A gallon of paint, if pigmented entirely with titanium dioxide, may, for exampe, conventionally contain up to 3 pounds of titanium dioxide, that is, about 300 parts of pigment to 5 parts of cation-modified clay. For moly orange, a typical ratio is 100 parts to 5 parts cation-modified clay. For chrome yellow, a typical ratio is 200:5. Where a low viscosity resin and a difficultly dispersed pigment is employed, 100 parts of pigment to 25 parts of cation-modified clay are not unusual.

After reaction, the aqueous dispersion comprising pigment and organophilic cation-modified clay is isolated, usually by filtration. It is generally washed, then dried.

Depending on the particle size of the resultant composition, it may be necessary to reduce the resultant composition to pigmentary size by conventional menas, such as hammermilling to reduce it to a form suitable for incorporation into a coating composition.

The compositions formed by the process described herein are more readily dispersible than separate addition of cation-modified clay and pigments and have improved anti-settling characteristics. These properties are displayed in any organic solvent-base coating composition. Typically an organic solvent-based coating composition comprises a pigment suspended in an organic vehicle, generally a natural or synthetic resin, and a solvent, generally employed to control viscosity and application properties.

The compositions of this invention display their dispersibility and anti-settling characteristics in virtually any solvent-base system and the vehicle resin and solvent are not critical.

For a comprehensive review of paint formulation and materials utilized, attention is drawn to ORGANIC COATING TECHNOLOGY, Volumes 1 and 2, by Payne, John Wiley & Sons, Inc. (1954 and 1961).

Typical examples of vehicle resins include varnish resins, natural resins, phenolic resins, oleoresinous materials, alkyd resins, epoxy resins, amino resins, vinyl resins and the like.

The method of preparing the pigment compositions of this invention is further described in conjunction with the following examples, which are to be considered illustrative rather than limiting. All parts and percentages in the examples and throughout the specification and claims are by weight unless otherwise specified.

EXAMPLE I

Into a reactor equipped with a slow speed mechanical agitator were charged 183 parts of dimethyl-dihydrogenated tallow ammonium chloride and 5,000 parts of water, and the mixture heated to 77°C. There was then added 1,370 parts of red iron oxide and 410 parts of yellow iron oxide and the mixture was thoroughly dispersed. There was added 274 parts of montmorillonite clay (Mineral Colloid BP). The mixture was stirred for three hours and there was then added 1,000 parts of hot water. There was then added 7,000 parts of hot water and the mixture stirred for 6 hours. The mixture was then filtered and washed with hot water and dried at 140°F. The resultant dried material was hammer-milled to pigmentary form.

EXAMPLE II

Into a reactor equipped with a slow speed mechanical agitator were charged 220 parts of dimethyl-dihydrogentated tallow ammonium chloride and 120,000 parts of water at 77°C. There was then added 3,840 parts of chrome oxide green pigment and stirred until thoroughly dispersed (one-half hour). There was later added 328 parts of montmorillonite clay (Mineral Colloid BP). The mixture was stirred for 1 hour and there was then added 1,000 parts of 77°C. water. After stirring 2 more hours, the resulting mixture was filtered and washed with warm water and dried at 140°F. The resultant material was hammermilled to pigmentary form.

EXAMPLE III

Into a reactor with slow speed agitation, were added 27 parts of dimethyl-dehydrogenated tallow ammonium chloride and 120,000 parts of water at 77°C. There was then added 2,500 parts of medium lead chromate yellow pigment and the mixture was stirred one hour until dispersed. There was then added 42 parts of Volcaly Bentonite BC (American Mineral Colloid Company) and the mixture stirred three hours, keeping the temperature at 77°C. The product was filtered, washed with warm water, dried and milled to pigmentary form.

EXAMPLE IV

Two pigmented stains were prepared as follows:

Composition I

| | Parts by Weight |
|---|---|
| Methyl ethyl ketoxime | 1.0 |
| Linseed oil | 110.0 |
| Ethanol | 5.0 |
| Pigment of Example I | 82.0 |

The above mixture was ground in a pebble mill to a Hegman No. 7 fineness. The above was then washed with two 50-part portions of linseed oil and two 30-part portions of mineral spirits. The resultant paste was admixed with:

| | |
|---|---|
| Linseed oil | 71.0 |
| Tung oil | 30.0 |
| Di(phenyl mercury dodecenyl succinate) | 5.0 |
| Lead drier | 2.71 |
| Cobalt drier | 1.35 |
| Mineral spirits | 296.0 |

Composition II

| | Parts by Weight |
|---|---|
| Mineral spirits | 5.0 |
| Sodium dioctyl sulfosuccinate | 4.0 |
| Methyl ethyl ketoxime | 1.0 |
| Linseed oil | 50.0 |
| Bentone 11* | 5.0 |
| Ethanol | 1.5 |
| Red iron oxide | 58.4 |
| Yellow iron oxide | 11.7 |
| Linseed oil | 60.1 |

Composition II—Continued

| | Parts by Weight |
|---|---|

The above mixture was ground to a Hegman No. 7 fineness. The above was then washed with two 50-part portions of linseed oil and two 30-part portions of mineral spirits. The resultant paste was admixed with:

| | |
|---|---|
| Linseed oil | 71.0 |
| Tung oil | 30.0 |
| Di(phenyl mercury dodecenyl succinate) | 5.0 |
| Lead drier | 2.71 |
| Cobalt drier | 1.35 |
| Mineral spirits | 287.00 |

*Montmorillonite clay (hydrous magnesium aluminum silicate, modified with the trimethyl octyl ammonium ion and containing 0.65 percent nitrogen)

The composition of the invention, Composition I, as compared to Composition II containing commercially-available cation-modified clay dispersing agent, showed greatly improved settling and re-dispersibility characteristics. When the compositions were allowed to settle for a time sufficient to cause complete settling of Composition II, the volume of the sediment was 5 percent, with 95 percent clear supernatant. The pigment cake was densely packed and could not be fully redispersed by stirring. At the same time, Composition I showed a fluffy sediment which comprised 25 percent of the volume with 75 percent clear supernatant. The pigment was readily redispersed in the supernatant by stirring.

In the above examples, other components such as clays, onium compounds, pigments, and vehicle systems as described hereinabove may be substituted to obtain the benefits described.

According to the provisions of the Patent Statutes, there are described above the invention and what are now considered its best embodiments; however, within the scope of the appended claims, it is to be understood that the invention can be practiced otherwise than as specifically described.

We claim:

1. A method of preparing a pigment composition comprising reacting in the presence of a pigment of clay exhibiting a substantial basic-change capacity and an organic onium compound capable of replacing the clay cations by a substituted cation of the class of onium bases consisting of ammonium, phosphonium, sulphonium, arsonium, stibonium, oxonium, and telluronium bases where said method is performed in an aqueous medium.

2. The product of the process of claim 1.

3. A method as in claim 1 wherein the base is an ammonium base.

4. The product of the process of claim 3.

5. A coating composition comprising (a) an organic solvent, (b) an organic vehicle resin, and (c) a pigment composition prepared by reacting in the presence of a pigment a cation-modified clay exhibiting a substantial basic-change capacity in an organic onium compound capable of replacing the clay cation by a substituted cation of the class of onium bases consisting of ammonium, phosphonium, sulphonium, arsonium, stibonium, oxonium and telluronium bases.

6. A composition as in claim 5 wherein the onium base is an ammonium base.

* * * * *

PO-1050
(5/69)

UNITED STATES PATENT OFFICE
CERTIFICATE OF CORRECTION

Patent No. 3,793,044     Dated Feb. 19, 1974

Inventor(s) Donald J. Voskuil, et al

It is certified that error appears in the above-identified patent and that said Letters Patent are hereby corrected as shown below:

Column 6, line 43,

"of" (second occurrence) should be ---a---.

Signed and sealed this 11th day of June 1974.

(SEAL)
Attest:

EDWARD M. FLETCHER, JR.
Attesting Officer

C. MARSHALL DANN
Commissioner of Patents